United States Patent
Horst et al.

(10) Patent No.: US 9,387,807 B2
(45) Date of Patent: Jul. 12, 2016

(54) LUGGAGE COMPARTMENT COVER AND VEHICLE WITH A LUGGAGE COMPARTMENT COVER

(71) Applicant: GM GLOBAL TECHNOLOGY OPERATIONS LLC, Detroit, MI (US)

(72) Inventors: Thomas Horst, Buettelborn (DE); Joerg Karger, Hanau (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/515,153

(22) Filed: Oct. 15, 2014

(65) Prior Publication Data

US 2015/0102622 A1 Apr. 16, 2015

(30) Foreign Application Priority Data

Oct. 15, 2013 (DE) .......................... 10 2013 017 104

(51) Int. Cl.
*B60N 3/12* (2006.01)
*B60R 5/04* (2006.01)

(52) U.S. Cl.
CPC .................. *B60R 5/045* (2013.01); *B60R 5/044* (2013.01)

(58) Field of Classification Search
CPC ........ B60R 5/044; B60R 5/045; B29C 70/38; B29C 70/384; B29C 70/388; B60P 3/14; B60P 7/14; B60P 3/04; B60P 3/36; B60P 1/00; B60P 1/027; B60P 1/43; B60P 1/435; B60P 3/10; B60P 3/32; B60P 3/34; B60P 3/423; B60P 7/04; B60P 7/0892

USPC ................................ 296/37.16, 24.43, 24.44
See application file for complete search history.

(56) References Cited

U.S. PATENT DOCUMENTS

| 4,148,516 A | * | 4/1979 | Gotomyo | 296/37.1 |
| 4,668,001 A | * | 5/1987 | Okumura et al. | 296/37.16 |
| 5,632,520 A | * | 5/1997 | Butz | 296/24.43 |
| 6,966,591 B2 | * | 11/2005 | Schlecht | 296/37.16 |
| 7,695,042 B2 | | 4/2010 | Leroy et al. | |
| 2002/0163220 A1 | * | 11/2002 | Ament et al. | 296/37.16 |
| 2007/0182190 A1 | * | 8/2007 | Walter et al. | 296/37.16 |
| 2012/0091745 A1 | * | 4/2012 | Cha et al. | 296/37.16 |

FOREIGN PATENT DOCUMENTS

| DE | 1613896 U | 9/1950 |
| DE | 29703408 U1 | 4/1997 |
| DE | 10007137 A1 | 8/2000 |
| DE | 10260573 A1 | 7/2004 |
| DE | 10333045 B3 | 10/2004 |
| DE | 102004051337 A1 | 5/2006 |

(Continued)

OTHER PUBLICATIONS

Search Report dated Dec. 10, 2014 in GB 1417323.1.

*Primary Examiner* — Glenn Dayoan
*Assistant Examiner* — Sunsurraye Westbrook
(74) *Attorney, Agent, or Firm* — Ingrassia Fisher & Lorenz PC

(57) ABSTRACT

A luggage compartment cover is disclosed for covering a luggage compartment of a vehicle. The luggage compartment cover features a rigid frame configured to be supported on a supporting surface of the vehicle. The luggage compartment cover includes a flexible sheet material fixed on and stretched by the frame.

19 Claims, 2 Drawing Sheets

(56) References Cited

FOREIGN PATENT DOCUMENTS

| | | |
|---|---|---|
| DE | 102005006686 A1 | 8/2006 |
| DE | 102007036926 A1 | 2/2009 |
| DE | 102008019924 A1 | 10/2009 |
| DE | 102010014539 A1 | 10/2011 |
| EP | 1738960 A1 | 1/2007 |
| EP | 1792780 A1 | 6/2007 |
| FR | 2943014 A1 | 9/2010 |
| FR | 2986199 A1 | 8/2013 |
| WO | 9961221 A1 | 12/1999 |

\* cited by examiner

LUGGAGE COMPARTMENT COVER AND VEHICLE WITH A LUGGAGE COMPARTMENT COVER

CROSS REFERENCE TO RELATED APPLICATION

This application claims priority to German Patent Application No. 102013017104.0 filed Oct. 15, 2013, which is incorporated herein by reference in its entirety.

TECHNICAL FIELD

The technical field pertains to a luggage compartment cover and vehicle with such a luggage compartment cover.

BACKGROUND

Almost every vehicle with a luggage compartment is provided with a luggage compartment cover, which is also commonly referred to as a hat shelf, in order to cover the luggage compartment. Many luggage compartment covers are coupled to a tailgate of the vehicle such that they pivot together with the tailgate being opened. There already exist luggage compartment covers that at least partially consist of a textile material.

For example, publication EP 1 855 916 B1 describes a receptacle for a vehicle with a trough-shaped container and a hat shelf that is designed for covering the trough-shaped container. The hat shelf is at least sectionally composed of a flexible material, wherein the flexible material consists of a flat textile element.

SUMMARY

The present disclosure provides a functionally-improved luggage compartment cover that has a low weight. In particular, a luggage compartment cover is proposed for covering a luggage compartment of a vehicle such as a passenger car. The luggage compartment cover is realized in a plate-shaped fashion. In a preferred embodiment, the luggage compartment cover has a rectangular or substantially rectangular outer contour with two short sides and with front and rear long sides. The short sides extend along two longitudinal sides of the vehicle when the luggage compartment cover is arranged in the vehicle. When the luggage compartment cover is arranged in the vehicle, the front long side is particularly directed toward the tailgate and the rear long side is directed toward the seats of the vehicle. The luggage compartment cover preferably includes a hat shelf or is realized in the form of a hat shelf.

The luggage compartment cover preferably is supported in the vehicle in a pivotable fashion. The luggage compartment cover may be configured to couple with the tailgate for pivoting together with the tailgate being opened. When the luggage compartment cover is coupled to the tailgate and the tailgate is opened, the front long side of the luggage compartment cover, in particular, is raised such that the luggage compartment is opened and can be accessed by a user.

The luggage compartment cover includes at least one rigid frame configured to be supported on at least one supporting surface of the vehicle. The at least one supporting surface preferably includes a side trim panel of the luggage compartment. The at least one supporting surface optionally extends within the vehicle along at least one of its longitudinal sides.

The luggage compartment cover further includes a flexible sheet material, particularly a pliable and/or deformable sheet material. The sheet material is fixed on and stretched by the at least one frame. It is preferred that the sheet material includes a textile fabric. The sheet material may alternatively include a panel, particularly a plastic panel. For example, the sheet material may be fixed on a top or bottom side of the frame. In the context of the present disclosure, it would also be conceivable to centrally clamp the sheet material between the upper side and the underside in a recess of the frame and to thusly fix the sheet material thereon.

The at least one frame defines an opening that is partially or completely covered by the sheet material. The opening preferably has a surface area of at least 0.2 square meter or 2 square feet, particularly at least 0.4 square meter or about 4 square feet, especially at least 0.6 square meter or about 6.5 square feet. The opening preferably has a surface area of no more than 2 square meter or about 21.5 square feet, particularly no more than 1.5 square meter or about 16 square feet. In a top view of the luggage compartment cover, the frame and the sheet material that covers the opening together optionally form 100 percent of the overall surface area. The surface area proportion of the opening covered by the sheet material preferably amounts to at least 40 percent, particularly at least 50 percent, especially at least 60 percent and no more than 90 percent, of the overall surface area.

In a preferred embodiment, it is advantageous that the sheet material in the form of a textile fabric and/or a panel has a relatively low weight. It is therefore possible to make available a functional luggage compartment cover that has a low weight. The plastic or pressboard material used in conventional luggage compartment covers particularly is at least partially replaced with the sheet material. The thusly achieved weight reduction advantageously makes it possible to reduce the fuel consumption of the vehicle and therefore to lower the operating costs.

In a preferred embodiment of the present disclosure, the at least one frame is realized in the form of one continuous peripheral frame. In this embodiment, the frame forms the two short sides and the front and rear long sides of the luggage compartment cover. The frame preferably consists of a plastic material, particularly a thermoplastic such as, in particular, polypropylene (PP).

In a preferred embodiment of the present disclosure, the sheet material has an edge region. The edge region preferably is inseparably connected to the at least one frame, for example, by means of a firmly bonded connection. In this respect, the edge region may be welded or glued to the frame. It would also be conceivable to inseparably connect the edge region to the at least one frame by means of a positive and/or non-positive connection.

In the context of the present disclosure, it would alternatively be conceivable to separably connect the edge region to the at least one frame by means of a positive and/or non-positive connection. For example, the edge region of the sheet material may be connected to the frame by means of a hook-type fastener, a Velcro fastener and/or a snap fastener such as, e.g., a patent fastener. In a separable connection, the sheet material can be at least partially separated from the frame such that the opening is uncovered in order to enable the user to reach through the opening. In this context, it would also be conceivable to roll up, fold or otherwise stow the sections of the sheet material separated from the frame in a space-saving fashion.

According to an embodiment of the present disclosure, the frame is realized in a U-shaped fashion in a cross section transverse to a longitudinal and/or lateral direction of the frame, particularly transverse to its long and/or short sides. The frame of U-shaped cross section preferably features an outer limb that is directed, in particular, toward the longitudinal sides of the vehicle and an inner limb that is directed, in particular, toward the seats of the vehicle, as well as a crosspiece that connects the outer and inner limbs to one another. In this implementation, the weight of the frame is advantageously reduced.

In a preferred embodiment of the present disclosure, the edge region of the sheet material covers the crosspiece and is optionally also folded around the outer limb of the frame. The edge region at least partially surrounds the outer limb in this case. It is particularly preferred to fix the edge region of the sheet material on the crosspiece and/or on the outer limb. It is particularly preferred to glue and/or weld the edge region to the crosspiece and/or to the outer limb. One advantage of this implementation can be seen in that the edge region has excellent tactile properties and is realized in an optically appealing fashion despite the reduced weight of the frame.

In a preferred embodiment of the present disclosure, the luggage compartment cover, particularly the frame, features at least one bumper. The at least one bumper preferably is designed for interlocking the luggage compartment cover in the vehicle. This advantageously makes it possible to prevent noises such as rattling noises created while the vehicle is in motion due to vibrations of the luggage compartment cover. The at least one bumper is alternatively or additionally designed for absorbing a mechanical shock exerted upon the luggage compartment cover. The bumpers particularly have spring-back properties. The shock upon the bumper is generated, for example, by closing the tailgate. The tailgate preferably contacts the luggage compartment cover at the bumpers when it is closed. In this context, it is advantageous if one or several bumpers is/are arranged on the front long side of the luggage compartment cover. In addition to at least partially absorbing the shock, the bumper advantageously causes the frame to end flush with the tailgate when it is closed and optionally also flush with the longitudinal sides of the vehicle when the luggage compartment cover is arranged in the vehicle. In order to realize the luggage compartment cover such that it ends flush with the longitudinal sides of the vehicle, one or more bumpers is/are alternatively or additionally to the front long side also arranged on both short sides of the luggage compartment cover.

In a preferred embodiment of the present disclosure two bumpers are arranged on the front long side of the luggage compartment cover, particularly on the outer limb of the frame. If the length of the front long side is divided into thirds, the two bumpers are preferably positioned in the two outer thirds. In the context of the present disclosure, a corresponding positioning of the two bumpers would alternatively or additionally also be possible on the short sides of the luggage compartment cover, particularly in the two outer thirds of the short sides if their length is divided into thirds. For example, the bumpers are respectively arranged at a distance of at least 150 millimeter or about 6 inches, preferably at least 200 millimeter or about 8 inches and/or no more than 300 millimeter about 12 inches, from the corner between the front long side and one of the two short sides.

For example, the at least one bumper has a length of at least 40 millimeter or about one and one-half inches, preferably at least 60 millimeter or about two and one-third inches, particularly at least 80 millimeter or about three inches and/or no more than 120 millimeter or about four and three-quarters inches. The width of the at least one bumper preferably is adapted to the width of the outer limb of the frame, on which the bumper is arranged, particularly identical or similar thereto. For example, the bumper has a width of at least 15 millimeter or about one-half inch, preferably at least 30 millimeter or about one inch, particularly at least 45 millimeter or about one and three-quarter inches and/or no more than 70 millimeter or about two and three-quarters.

In a preferred constructive implementation of the present disclosure, the bumper is formed in that the outer limb is separated from the crosspiece in a segment of the frame, particularly in a cross section through the bumper and transverse to the longitudinal direction of the long or short side of the luggage compartment cover. In a front view of the bumper, the length of the segment, in which the outer limb is separated from the crosspiece, preferably amounts to no more than 200 millimeter or about 8 inches, particularly no more than 150 millimeter or about 6 inches, especially no more than 100 millimeter or about 4 inches. The outer limb separated from the crosspiece particularly is only connected to the crosspiece by the edge region of the sheet material that at least partially surrounds the outer limb. In this implementation of the present disclosure, the edge region particularly forms a spring-back bridge between the outer limb and the crosspiece. The bumper can be inexpensively produced of the existing components. Additional components are not required such that the costs can be reduced.

In an alternative constructive implementation of the present disclosure, the frame features a spring segment that forms the bumper. The spring segment is formed, for example, by an integral spring-back tab or lug on the outer limb. The spring segment is particularly formed by a u-shaped cutout in the outer limb. The edge region of the sheet material preferably features an opening, through which the tab or lug can protrude.

In a preferred embodiment of the present disclosure, the luggage compartment cover features at least one interface for being pivotably arranged in the vehicle. The interface preferably is designed for being coupled to an opposed interface of the vehicle. The interface advantageously makes it possible to pivot the luggage compartment cover upward with the front long side in order to open the luggage compartment. The at least one interface preferably is arranged on the frame, particularly on the rear end of the short sides of the luggage compartment cover. The interface particularly is formed on and/or integrated into the outer limb of the frame. The at least one interface is realized, for example, in the form of a pivot pin or in the form of an Omega bracket. The edge region of the sheet material preferably features at least one opening for the at least one interface such that this interface is not covered by the edge region and can be easily coupled to the opposed interface of the vehicle.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description. Corresponding or identical components are respectively identified by the same reference symbols in the figures.

Figure 1:
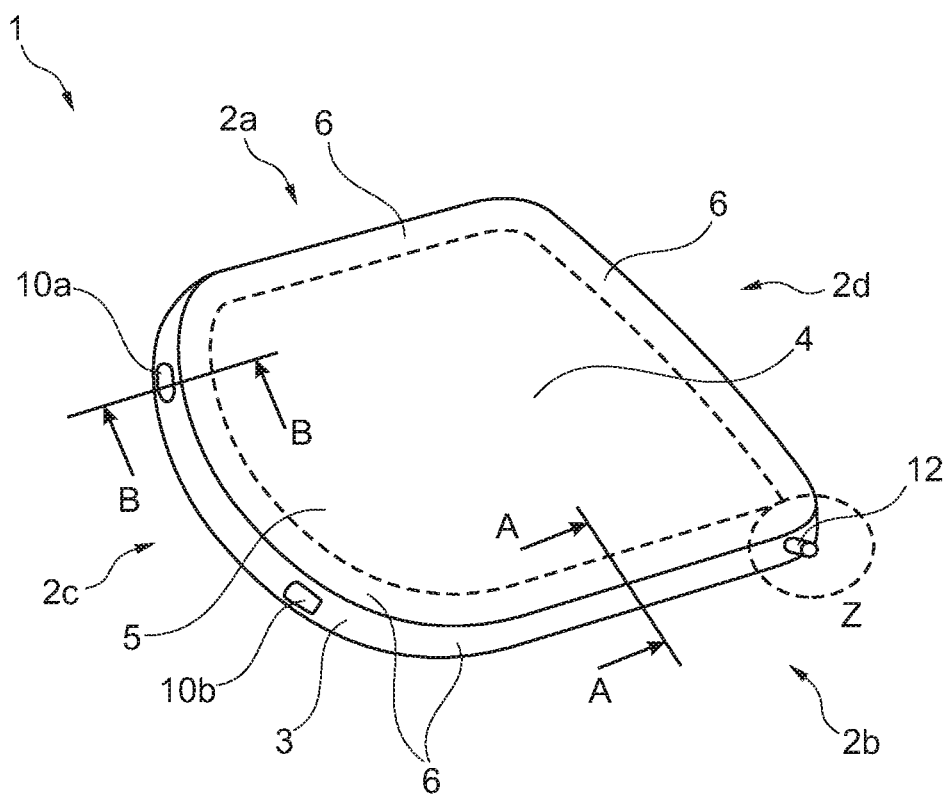
FIG. 1 shows a perspective view of the luggage compartment cover with a frame and with a sheet material.

FIG. 1 shows a perspective view of a luggage compartment cover 1 that is designed for covering a luggage compartment of a vehicle. The luggage compartment cover 1 has a rectangular or substantially rectangular outer contour with two short sides 2a; 2b and front and rear long sides 2c; 2d. The front long side 2c is directed toward a tailgate of the vehicle and the rear long side 2d is directed toward the seats of the vehicle when the luggage compartment cover 1 is arranged in the vehicle. The short sides 2a; 2b of the luggage compartment cover 1 extend along two longitudinal sides of the vehicle. The luggage compartment cover 1 may be coupled to the tailgate of the vehicle, e.g., by means of two bands or strings such that it is pivoted upward together with the tailgate being opened and the luggage compartment is opened in order to be accessed by a user.

The luggage compartment cover 1 features a continuous peripheral frame 3. The frame 3 defines an opening 4 that is completely covered by a flexible sheet material 5. The frame 3 and the sheet material 5 covering the opening 4 together form 100 percent of an overall surface area. The surface area proportion of the opening 4 covered by the sheet material 5 preferably amounts to at least 40 percent, particularly at least 50 percent, especially at least 60 percent and no more than 90 percent. The opening 4 has a surface area of at least 0.2 square meter or about 2 square feet, particularly at least 0.4 square meter or about 4 square feet, especially at least 0.6 square meter or about 6.5 square feet. The opening preferably has a surface area of no more than 2 square meter or about 21.5 square feet, particularly no more than 1.5 square meter or about 16 square feet. The sheet material 5 features an edge region 6, by means of which it is fixed on the frame 3. The sheet material 5 is inseparably fixed on the frame 3 by means of a firmly bonded connection. In this way, the sheet material 5 is flatly stretched. Alternatively, the sheet material may be inseparably or separably connected to the frame 3 by means of a positive and/or non-positive connection.

The frame 3 is realized rigidly, particularly of a plastic material such as, for example, polypropylene (PP). It is designed for being supported on at least one supporting surface of the vehicle. For example, the frame 3 is supported on at least one supporting surface of a side trim panel of the luggage compartment of the vehicle, wherein the at least one supporting surface extends along the sidewalls of the vehicle.

The flexible sheet material 5 is realized flexibly and consists of a textile fabric. Alternatively, the flexible sheet material 5 may be realized in the form of plastic netting. The sheet material 5 particularly has pliable and/or deformable properties. The textile fabric or the plastic netting has the advantage of a relatively low weight. Consequently, the overall weight of the luggage compartment cover 1 can be significantly reduced in comparison with conventional luggage compartment covers that consist entirely of rigid plastic or pressboard material.

Figure 2:
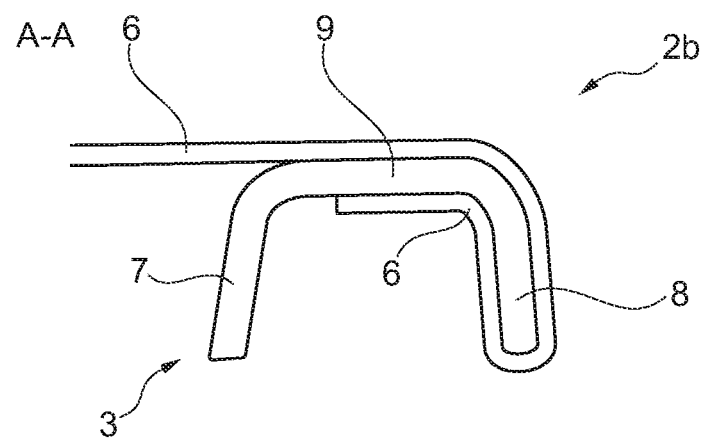
FIG. 2 shows a cross section through the frame along the line of section A-A.

FIG. 2 shows a cross section through the second short side 2b of the luggage compartment cover 1 along the line of section A-A in FIG. 1. This figure particularly shows a cross section through the frame 3 and the edge region 6 of the sheet material 5 fixed thereon.

The frame 3 is realized with a U-shaped cross section. It features an inner limb 7 and an outer limb 8, wherein the inner limb 7 is directed toward a luggage compartment center and the outer limb 8 is directed toward the longitudinal sides of the vehicle in the installed state of the luggage compartment cover 1. The frame 3 features a crosspiece 9 that connects the inner and the outer limb 7; 8 to one another. The edge region 6 of the sheet material 5 (FIG. 1) is supported on the crosspiece 9 and folded around the outer limb 8 of the frame 3 such that it completely surrounds this outer limb. The edge region 6 is glued or welded to the crosspiece 9 and to the outer limb 8. In this way, the sheet material 5 is securely and permanently connected to the frame 3.

Figure 3:
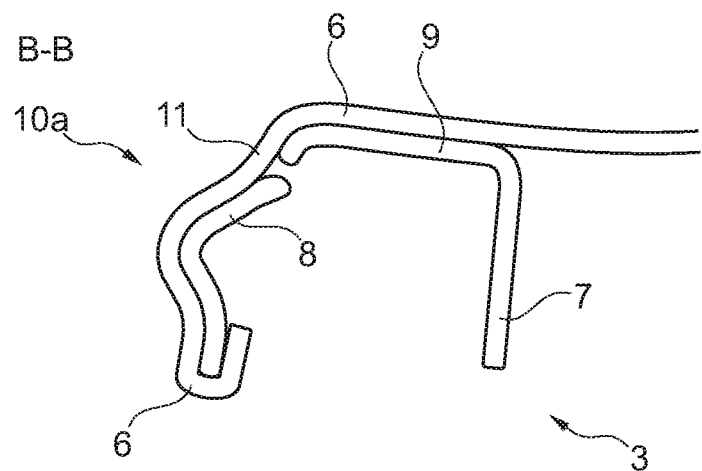
FIG. 3 shows a cross section through a bumper arranged on the frame along the line of section B-B.

FIG. 3 shows a cross section through one of two bumpers 10a; 10b of the luggage compartment cover 1 that are arranged on the front long side 2c of the luggage compartment cover 1, namely along the line of section B-B in FIG. 1. According to FIG. 1, the two bumpers 10a; 10b are directed toward the tailgate of the vehicle when the luggage compartment cover 1 is arranged in the vehicle.

According to FIG. 3, the bumper is formed in that the outer limb 8 of the frame 3 is separated from the crosspiece 9 in two segments of the front long side 2c. The edge region 6 of the sheet material 5 is connected to the crosspiece 9 and to the outer limb 8 by means of a firmly bonded connection. The outer limb 8 particularly is partially surrounded by the edge region 6. Consequently, the outer limb 8 is held on the crosspiece 9 by the edge region 6 of the sheet material 5 only. The edge region 6 forms a spring-back bridge 11 at the point of separation between the crosspiece 9 and the outer limb 8.

A shock exerted upon the luggage compartment cover 1 can be sustained, particularly at least partially absorbed, by the bumpers 10a; 10b, particularly by the spring-back bridge 11. The shock is generated, for example, when the tailgate of the vehicle is closed and exerted upon the front long side 2c (FIG. 1).

When the tailgate is closed, the bumpers 10a; 10b (FIG. 1) ensure that the front long side 2c of the luggage compartment cover 1 ends flush with the inner side of the tailgate. It would furthermore be possible that the luggage compartment cover 1 features additional bumpers on the short sides 2a; 2b.

In an alternative exemplary embodiment, the bumpers 10a; 10b are formed by a spring segment arranged on the frame 3. The spring segment may be implemented, for example, in the form of a spring-back tab or lug formed on the outer limb 8. The spring segment is realized, for example, in the form of a u-shaped cutout in the outer limb 8.

The luggage compartment cover 1 features an interface 12 on the rear end of each short side 2a; 2b. The interface 12 is designed for arranging the luggage compartment cover 1 in the vehicle in a pivotable fashion. For this purpose, the vehicle features a corresponding opposed interface that is preferably realized on the lateral trim panels of the luggage compartment. For example, the luggage compartment cover 1 is and/or can be supported in a pivotable fashion relative to the longitudinal sides of the vehicles in such a way that the front long side 2c can be pivoted upward, if applicable, together with the tailgate.

Figure 4A:
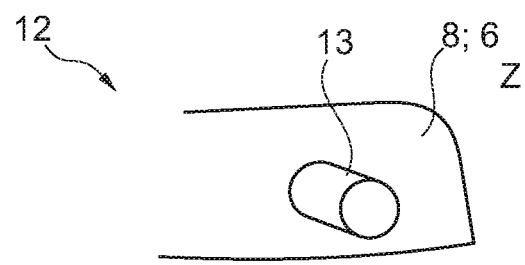
FIG. 4a shows an interface of the luggage compartment cover for the pivotable arrangement of the luggage compartment cover in the vehicle.

According to FIG. 4a, the interface 12 is realized in the form of a pivot pin. The pivot pin 13 is formed on the outer limb 8 of the frame 3 and perpendicularly protrudes therefrom in the direction of a longitudinal side of the vehicle when the luggage compartment cover 1 is arranged in the vehicle. The edge region 6 of the sheet material 5 surrounds the outer limb 8 is illustrated in FIG. 2 and features an opening for the pivot pin 13.

The opposed interface of the vehicle to the pivot pin 13 is realized in the form of a cylindrical hole or in the form of an Omega bracket 14 (FIG. 4b) in the lateral trim panels of the luggage compartment, into which the pivot pin 13 engages and/or can engage.

Figure 4B:
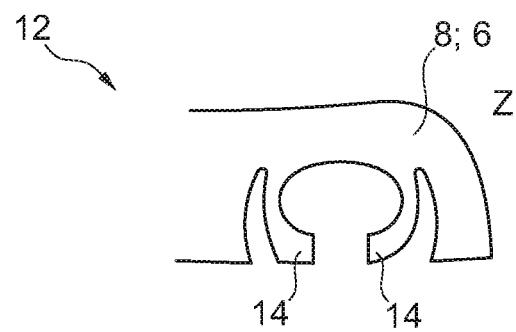
FIG. 4b shows an alternative interface for the pivotable arrangement of the luggage compartment cover in the vehicle.

FIG. 4b shows an alternative constructive implementation of the interface 12 for arranging the luggage compartment cover 1 in the vehicle in a pivotable fashion. The interface 12 is integrated into the outer limb 8 of the frame 3 in the form of an Omega bracket 14. The edge region 6 of the sheet material 5 surrounds the outer limb 8 as illustrated in FIG. 2 and features an opening for the Omega bracket 14. The proposed interface of the vehicle to the Omega bracket 14 is realized, e.g., in the form of a bolt or pin that perpendicularly protrudes from the lateral trim panels of the luggage compartment and engages and/or can engage into the Omega bracket 14.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A luggage compartment cover for covering a luggage compartment of a vehicle, wherein the luggage compartment cover comprises:
   at least one rigid frame configured for support on at least one supporting surface of the vehicle and defining an opening;
   a flexible sheet material fixed on and stretched by the at least one rigid frame, wherein the flexible sheet material covers the opening; and
   at least one bumper configured to interlock the luggage compartment cover in the vehicle, and absorb shocks exerted upon the luggage compartment cover;
   wherein the bumper causes the at least one rigid frame to end flush with a tailgate of the vehicle when the tailgate is closed and end flush with longitudinal sides of the vehicle when the luggage compartment cover is arranged in the vehicle.

2. The luggage compartment cover according to claim 1, wherein the frame defined a continuous peripheral frame.

3. The luggage compartment cover according to claim 1, wherein the frame comprises a rigid plastic frame.

4. The luggage compartment cover according to claim 1, wherein the rigid frame and the sheet material covering the opening together form 100 percent of an overall surface area, and wherein the surface area proportion of the opening covered by the sheet material amounts to at least 40 percent of the overall surface area.

5. The luggage compartment cover according to claim 4, wherein the rigid frame and the sheet material covering the opening together form 100 percent of an overall surface area, and wherein the surface area proportion of the opening covered by the sheet material amounts to at least 60 percent of the overall surface area.

6. The luggage compartment cover according to claim 4, wherein the rigid frame and the sheet material covering the opening together form 100 percent of an overall surface area, and wherein the surface area proportion of the opening covered by the sheet material amounts to no more than 90 percent of the overall surface area.

7. The luggage compartment cover according to claim 1, wherein the sheet material comprises a firmly bonded connection between an edge region of the sheet material and the at least one rigid frame.

8. The luggage compartment cover according to claim 1, wherein the frame comprises a U-shaped cross section transverse to at least one of a longitudinal direction and lateral direction of the frame, wherein the U-shaped cross section includes an inner limb, an outer limb and a crosspiece connecting the inner limb to the outer limb, wherein an edge region of the sheet material covers the crosspiece and is folded around and at least partially surrounds the outer limb of the U-shaped cross section.

9. The luggage compartment cover according to claim 8, wherein the edge region of the sheet material is fixed on at least one of the crosspiece and the outer limb.

10. The luggage compartment cover according to claim 9, wherein the at least one bumper comprises a segment formed in the outer limb of the frame separated from the crosspiece and connected only to the crosspiece by tile edge region sheet material that at least partially surrounds the outer limb such that tire edge region forms a spring-back bridge between the outer limb and the crosspiece.

11. The luggage compartment cover according to claim 10, wherein the frame comprises at least one spring segment that forms the at least one bumper.

12. The luggage compartment cover according to claim 8, wherein the luggage compartment cover comprises at least one interface configured to be pivotably arranged in the vehicle.

13. The luggage compartment cover according to claim 12, wherein the at least one interface is arranged on the outer limb of the frame, particularly formed thereon and/or integrated therein.

14. The luggage compartment cover according to claim 12, wherein the at least one interface comprises a pivot pin.

15. The luggage compartment cover according to claim 12, wherein the at least one interface comprises an Omega bracket.

16. The luggage compartment cover according to claim 1, wherein the sheet material comprises a textile fabric or consists of the textile fabric.

17. The luggage compartment cover according to claim 1, wherein the sheet material consists of a textile fabric.

18. The luggage compartment cover according to claim 1, wherein the luggage compartment cover comprises at least one interface configured to be pivotably arranged in the vehicle.

19. A vehicle comprising:
   a vehicle body having a luggage compartment including a support surface;
   a luggage compartment cover including a rigid frame supported on the support surface of the vehicle, wherein the rigid frame defines an opening; and
   a flexible sheet material fixed on and stretched by the rigid frame, wherein the flexible sheet material covers the opening; and
   at least one bumper configured to interlock the luggage compartment cover in the vehicle, and absorb shocks exerted upon the luggage compartment cover;
   wherein the bumper causes the at least one rigid frame to end flush with a tailgate of the vehicle when the tailgate is closed and end flush with longitudinal sides of the vehicle when the luggage compartment cover is arranged in the vehicle.

* * * * *